United States Patent
Avasiloaie et al.

(10) Patent No.: US 11,014,539 B2
(45) Date of Patent: May 25, 2021

(54) REFILLABLE WIPER BLADE WITH REFILL SUBASSEMBLY

(71) Applicant: Trico Products Corporation, Rochester Hills, MI (US)

(72) Inventors: Valentin Avasiloaie, Dearborn Heights, MI (US); Mitica Polocoser, Wayne, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 15/772,827

(22) PCT Filed: Nov. 2, 2016

(86) PCT No.: PCT/US2016/060108
§ 371 (c)(1),
(2) Date: May 2, 2018

(87) PCT Pub. No.: WO2017/079293
PCT Pub. Date: May 11, 2017

(65) Prior Publication Data
US 2018/0312139 A1    Nov. 1, 2018

Related U.S. Application Data

(60) Provisional application No. 62/249,666, filed on Nov. 2, 2015.

(51) Int. Cl.
*B60S 1/38*     (2006.01)
*B60S 1/40*     (2006.01)

(52) U.S. Cl.
CPC .......... *B60S 1/3851* (2013.01); *B60S 1/3856* (2013.01); *B60S 1/3863* (2013.01); *B60S 1/387* (2013.01); *B60S 1/4009* (2013.01)

(58) Field of Classification Search
CPC .... B60S 1/3858; B60S 1/3853; B60S 1/3851; B60S 1/3863; B60S 1/387;
(Continued)

(56) References Cited

U.S. PATENT DOCUMENTS 1,874,118 A * 8/1932 Pierce ................... B60S 1/4006
                                                        15/250.33
2,741,792 A * 4/1956 Ehrlich ................. B60S 1/3801
                                                        15/250.452

(Continued)

FOREIGN PATENT DOCUMENTS

WO        2015130072        9/2015

*Primary Examiner* — Gary K. Graham
(74) *Attorney, Agent, or Firm* — Miller Canfield

(57) ABSTRACT

A refillable wiper blade (36) including a refill subassembly (38) and a coupler (48) adapted for releasable attachment thereto. The refill subassembly includes a wiping element (42), an elongated spline (44) supporting the element, and a retention clip (46) operatively attached to the spline. The clip has a body (58) and an upwardly-biased cantilevered finger (60) extending from the body. The coupler has a first end (62A) shaped to receive the body of the clip, and a relief (64) defined adjacent to the first end and shaped to accommodate the finger of the clip. The refill subassembly and the coupler cooperate such that predetermined movement of the coupler with respect to the refill subassembly brings the body into engagement with the first end of the coupler such that the finger deflects downwardly until subsequent movement of the coupler along the spline releases the finger upwardly and into the relief of the coupler thereby securing the refill subassembly to the coupler.

18 Claims, 13 Drawing Sheets

(58) Field of Classification Search
CPC ........ B60S 2001/3817; B60S 2001/382; B60S 1/3856; B60S 1/3889; B60S 2001/4054; B60S 1/3849; B60S 1/3891; B60S 1/3886; B60S 1/3887; B60S 1/4009
USPC ......... 15/250.451–250.454, 250.361, 250.43
See application file for complete search history.

(56) References Cited

U.S. PATENT DOCUMENTS

| | | | | |
|---|---|---|---|---|
| 2,782,442 | A * | 2/1957 | Krohm | B60S 1/3801 15/250.452 |
| 2,782,447 | A * | 2/1957 | Anderson | B60S 1/3801 15/250.453 |
| 2,924,839 | A * | 2/1960 | Anderson | B60S 1/3801 15/250.454 |
| 4,336,625 | A * | 6/1982 | Maiocco | B60S 1/38 15/250.451 |
| 6,112,365 | A * | 9/2000 | Ullrich | B60S 1/3801 15/250.451 |
| 7,503,095 | B2 * | 3/2009 | Lin | B60S 1/381 15/250.201 |
| 7,979,950 | B2 * | 7/2011 | Boland | B60S 1/3848 15/250.32 |
| 8,191,201 | B2 * | 6/2012 | De Block | B60S 1/3867 15/250.32 |
| 8,479,349 | B2 * | 7/2013 | Boland | B60S 1/3848 15/250.32 |
| 2009/0199357 | A1 | 8/2009 | Thienard | |
| 2013/0067676 | A1 * | 3/2013 | Yoshimoto | B60S 1/3889 15/250.32 |
| 2014/0130282 | A1 | 5/2014 | Avasiloaie et al. | |

* cited by examiner

REFILLABLE WIPER BLADE WITH REFILL SUBASSEMBLY

CROSS-REFERENCE TO RELATED APPLICATIONS

This application claims priority to and all the benefits of U.S. Provisional Application No. 62/249,666, filed on Nov. 2, 2015.

BACKGROUND OF THE INVENTION

1. Field of the Invention

The present invention relates, generally, to wiper blades and, more specifically, to a refillable wiper blade with a refill subassembly.

2. Description of the Related Art

Conventional automotive wiper systems known in the art typically include some type of wiper blade (sometimes referred to as a "wiper blade assembly" or "wiper assembly") mounted to a wiper arm which, in turn, is mounted adjacent to a surface to be wiped, such as a windshield of a vehicle, and pivotally driven to impart reciprocal motion to the wiper blade across the windshield. The wiper blade typically includes a rubber wiping element that contacts the windshield across the surface to be wiped. Modern wiper blades often incorporate one or more metal strips that act to reinforce the wiping element and facilitate wiping contact by the wiping element across what is typically a curved glass surface. The wiper blade also typically includes a coupler that attaches to and supports the one or more metal strips, and an adapter attached to the coupler which allows the wiper blade to be releasably attached to the wiper arm. In this context, the wiper arm delivers a downward force to the wiper blade that is distributed thereacross, pressing the wiper blade into contact with the windshield. The wiper blade may also include an airfoil that attaches to the metal strips, and may also include pair of end caps located at distal ends of the wiper blade.

It will be appreciated that a releasable attachment of the wiper blade is necessitated because of wear, damage, and/or decreased performance overtime. Indeed, wiper blades generally perform best when new and are expected to deteriorate over time, such as due to friction occurring between the wiping element and the surface to be wiped. In addition, wear and deterioration can be exacerbated by certain operating conditions, such as frequency and duration of use, environmental temperature fluctuations, exposure to abrasive materials (for example, dust, dirt, mud, leaves, and the like), and/or exposure to contaminants (for example, automotive cleaning agents, organic material from bug-splatter or bird droppings, and the like). Thus, the perceived need for replacing wiper blades is generally subjective and can vary widely based on use. Moreover, there is a tendency for consumers to replace wiper blades only after a significant decrease in wiping performance, as opposed to replacing the wiper blades as soon as wiping quality begins to deteriorate. Indeed, consumers often replace wiper blades as-needed as opposed to at regularly-scheduled intervals, in particular where rain is infrequent or sporadic.

Each of the components of a wiper blade of the type described above must cooperate to effectively clean the surface to be wiped. In addition, each of the components must be designed not only to facilitate improved wipe quality, but also so as to reduce the cost and complexity of manufacturing and assembling the wiper blade. While wiper blades known in the related art have generally performed well for their intended purpose, there remains a need in the art for wiper blades that has superior operational characteristics, reduces the cost of manufacturing the assembly, and provides a simple releasable attachment to a wiper arm. Moreover, there remains a need in the art to ensure that consumers are afforded consistent and predictable wipe quality in a cost-effect manner.

SUMMARY OF THE INVENTION

The present invention overcomes the disadvantages in the related art by providing a refillable wiper blade including a refill subassembly and a coupler adapted for releasable attachment to the refill subassembly. The refill subassembly includes a wiping element adapted to contact the surface to be wiped, at least one elongated spline acting to support the wiping element, and a retention clip operatively attached to the spline. The retention clip has a clip body and an upwardly-biased cantilevered finger extending from the clip body. The coupler has a first end shaped to receive the clip body of the retention clip, and a relief defined adjacent to the first end and shaped to accommodate the cantilevered finger of the retention clip. The refill subassembly and the coupler cooperate such that predetermined movement of the coupler with respect to the spline of the refill subassembly brings the clip body into engagement with the first end of the coupler such that the cantilevered finger deflects downwardly until subsequent movement of the coupler along the spline releases the cantilevered finger upwardly and into the relief of the coupler thereby securing the refill subassembly to the coupler.

In addition, the present invention is directed toward a refill subassembly for releasably attaching to a wiper blade coupler having a first end and a relief defined adjacent to the first end. The refill subassembly includes a wiping element adapted to contact the surface to be wiped, at least one elongated spline acting to support the wiping element, and a retention clip operatively attached to the spline. The retention clip has a clip body shaped for receipt in the first end of the coupler, and an upwardly-biased cantilevered finger extending from the clip body and shaped for accommodation in the relief of the coupler. The refill subassembly cooperates with the coupler such that predetermined movement of the refill subassembly within the coupler brings the clip body into engagement with the first end of the coupler such that the cantilevered finger deflects downwardly until subsequent movement of the spline with respect to the first end of the coupler releases the cantilevered finger upwardly and into the relief of the coupler thereby securing the refill subassembly to the coupler.

In this way, the adapter and wiper blade of the present invention cooperate to effectively clean a surface to be wiped and, at the same time, provide a simple releasable attachment to a wiper arm. Further, the adapter and wiper blade of the present invention provide advantages related to manufacturing and component assembly.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
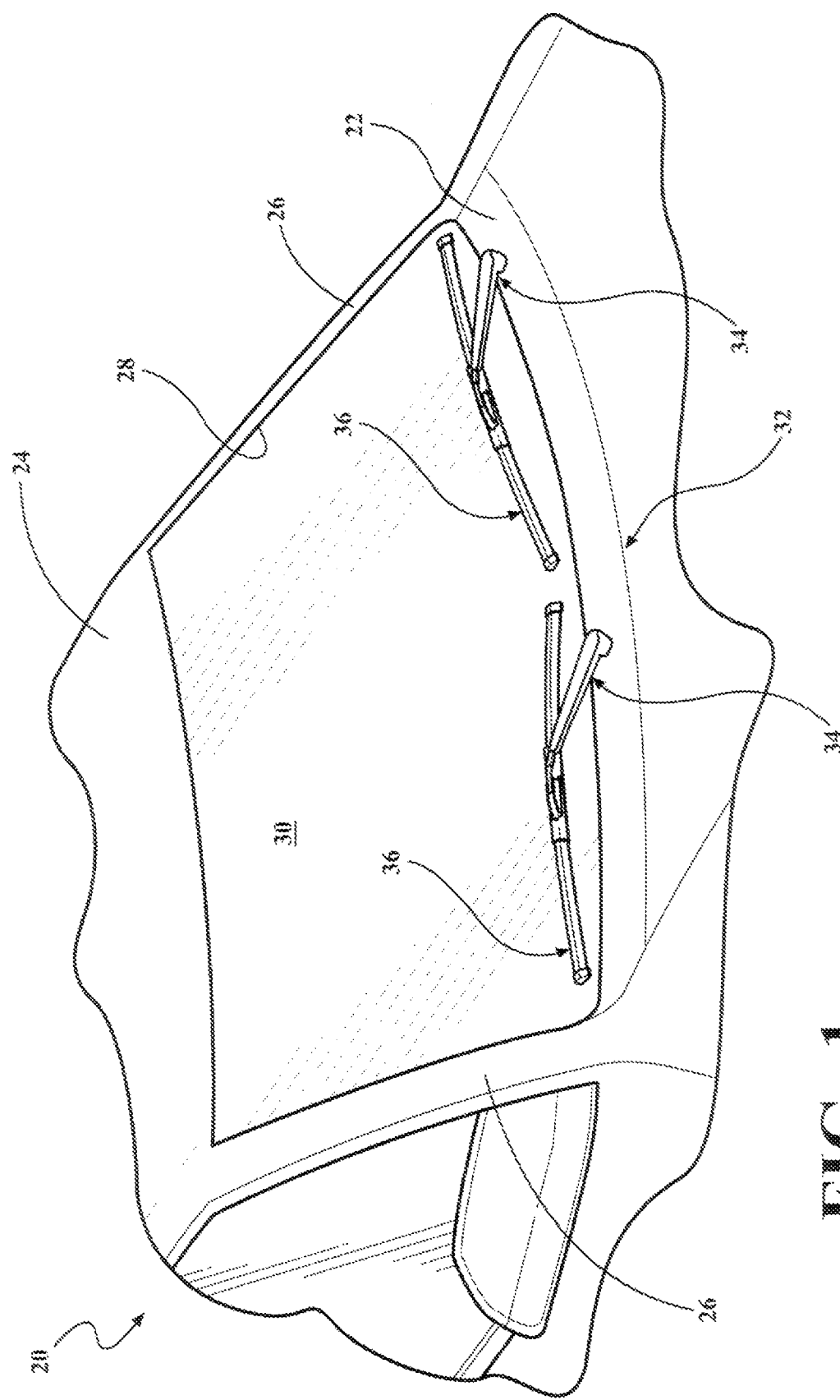
FIG. 1 is a partial perspective view of a front of a vehicle having a pair of wiper blades pivotally mounted to respective wiper arms for reciprocal movement across a windshield of the vehicle.
Figure 2:
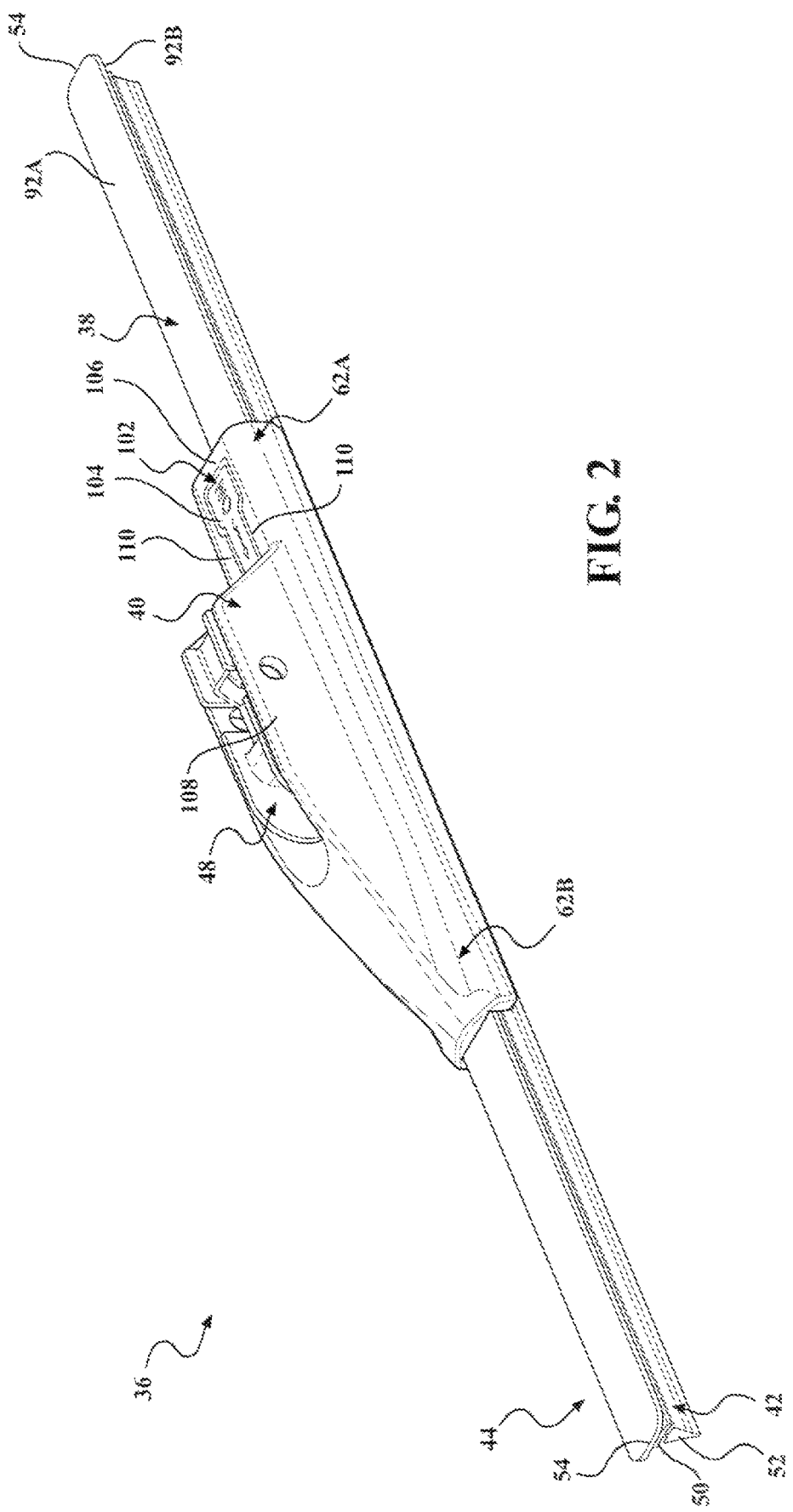
FIG. 2 is an enlarged perspective view of a refillable wiper blade having a coupler and a refill subassembly according to one embodiment of the present invention.
Figure 3:
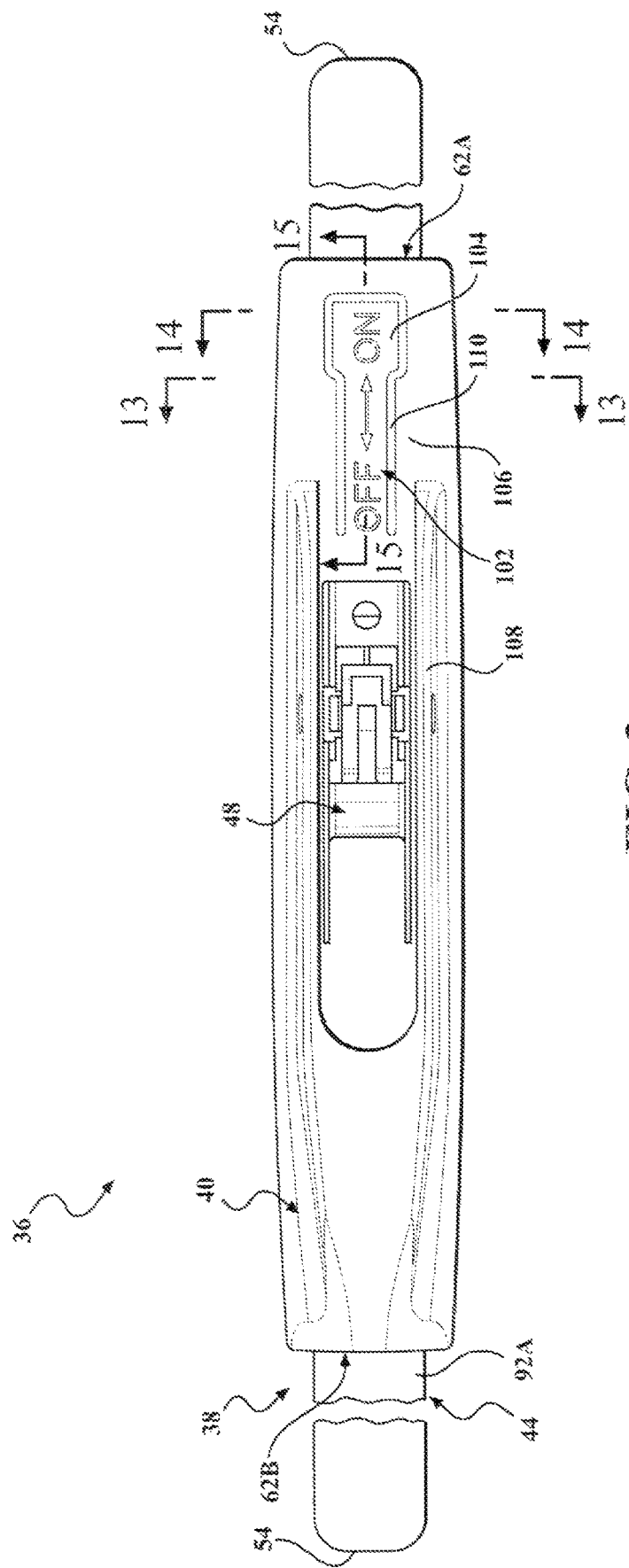
FIG. 3 is a fragmentary top plan view of the refillable wiper blade of FIG. 2.

With reference to the Figures, where like numerals are used to designate like a corresponding structure throughout the several views, a portion of a vehicle is schematically illustrated at 20 in FIG. 1. The vehicle 20 includes a cowl 22, a roof 24, and a pair of laterally spaced front A-pillars 26 extending between the roof 24 and the cowl 22. The A-pillars 26, roof 24, and cowl 22 cooperate to define a generally rectangular opening 28 in which a curved or "swept back" glass windshield 30 is supported. As illustrated, the vehicle 20 is an automobile, but could be any type of vehicle, such as a heavy-duty truck, train, airplane, ship, construction vehicle or equipment, military vehicle, or any other type of vehicle that utilizes surface wiper systems.

A wiper system is generally indicated at 32 in FIG. 1 and is employed to clean the windshield 30. The wiper system 32 includes a pair of wiper arms, generally indicated at 34, and a pair of wiper blades, generally indicated at 36, which correspond to the driver and passenger sides of the vehicle 20. However, those having ordinary skill in the art will appreciate that the wiper system 32 could employ a single wiper arm 34 and single wiper blade 36, or more than two wiper arms 34 and more than two wiper blades 36, without departing from the scope of the present invention. In the representative example illustrated herein, each wiper blade 36 is carried by a corresponding wiper arm 34. The wiper system 32 also includes an electric motor (not shown, but generally known in the art) to move the wiper blades 36 in an oscillating manner across the surface of the windshield 30. As shown in FIG. 1, the wiper blade 36 may include one or more airfoils employed to prevent lifting away from the surface of the windshield 30 in operation (not shown in detail, but generally known in the art), and one or more end caps employed to secure the airfoil to the wiper blade 36 (not shown in detail, but generally known in the art).

While the wiper blades 36 illustrated in FIG. 1 are shown as being utilized in connection with the front windshield 30 of the vehicle 20, those having ordinary skill in the art will appreciate that wiper blades 36 could be used in other areas of the vehicle 20 that employ a wiper system 32, such as a rear window (not shown) or a head lamp (not shown). Thus, it will be understood that the present invention is not limited for use solely in connection with wiper systems 32 adapted for use on a vehicle's windshield 30, but for use in all applications where wiper systems 32 are employed.

Referring now to FIGS. 2-6 and 13, the present invention is directed toward a refillable wiper blade 36 which includes a refill subassembly, generally indicated at 38, adapted for releasable attachment to a coupler, generally indicated at 40, as described in greater detail below. The refill subassembly 38 includes a wiping element 42 that is adapted to contact a surface of the vehicle 20 to be wiped, in this representative example, the windshield 30. The refill subassembly 38 also includes at least one elongated spline 44 that defines a longitudinal axis and that acts to reinforce or otherwise support the wiping element 42. In the representative embodiment illustrated herein, the spline 44 is a monolithic beam mounted directly to the wiping element 42, as described in greater detail below. However, those having ordinary skill in the art will appreciate from the description that follows that the spline 44 could be either monolithic or defined by a pair of elongated splines (not shown, but generally known in the art) without departing from the scope of the present invention. The refill subassembly 38 also includes a retention clip 46 operatively attached to the spline 44 and arranged so as to facilitate releasable attachment of the refill subassembly 38 to the coupler 40. The coupler 40, in turn, secures and supports the refill subassembly 38 in operation and facilitates connection to the wiper arm 34. To this end, the coupler 40 may directly connect to the wiper arm 34, or may be configured so as to attach to an adapter 48 which, in turn, connects to the wiper arm 34. Each of these components will be described in greater detail below.

In general, adapters 48 are employed to facilitate releasable attachment of wiper blades 36 to one or more types of wiper arms 34. In the representative embodiment illustrated herein, the adapter 48 is pivotally attached to the coupler 40 and is configured to releasably attach to a "hook-type" wiper arm 34 (see FIGS. 1-4; not shown in detail, but generally known in the art). Those having ordinary skill in the art will appreciate that different vehicle 20 manufacturers employ different types of wiper arms 34, depending on the application. By way of example, certain wiper arms 34 employed by vehicle 20 manufacturers include "bayonet-style"; "pin-type"; "hook-type"; "push-button"; "pinch-tab"; "side-lock" or "side-pin" arm-to-blade connection systems of various sizes. As such, it will be appreciated that wiper arms 34 can be connected to wiper blades 36 in a number of different ways, using different sizes and styles of connection systems, without departing from the scope of the present invention.

Figure 13:
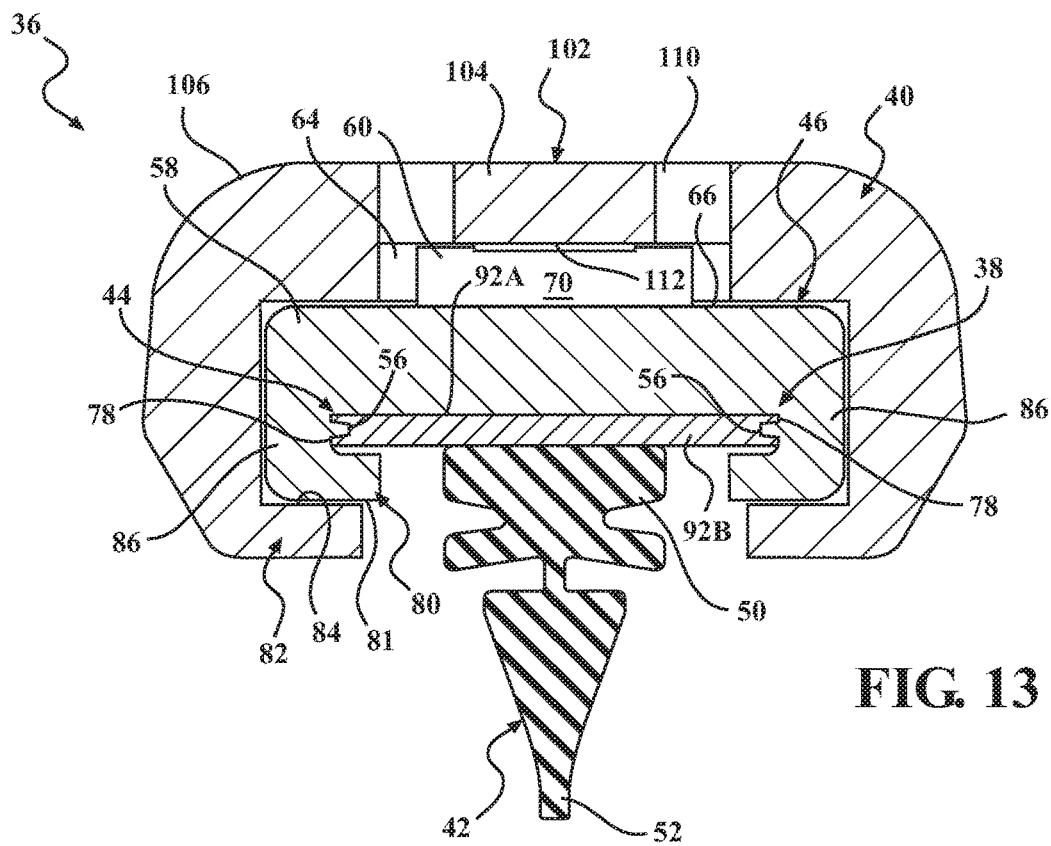
FIG. 13 is a sectional view taken along line 13-13 of FIG. 3.
Figure 14:
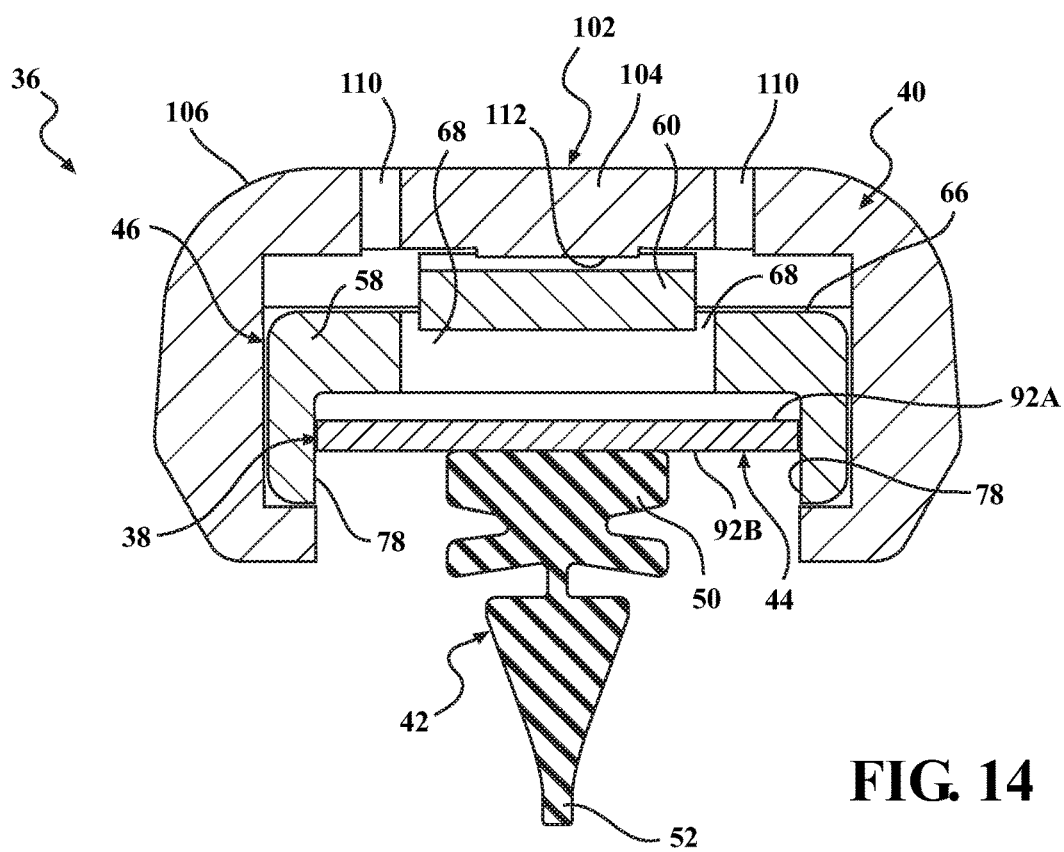
FIG. 14 is a sectional view taken along line 14-14 of FIG. 3.

As noted above, the refill subassembly 38 includes a wiping element 42 adapted to contact the surface to be wiped. The wiping element 42 is configured to a predetermined length corresponding to a particular application, and is often manufactured through an extrusion process which enables the length of the wiping element 42 to be easily adjusted without a substantial increase in manufacturing expense. While the wiping element 42 is constructed from a flexible rubber, those having ordinary skill in the art will appreciate that the wiping element 42 could be constructed from any flexible material, such as silicone or another polymer, without departing from the scope of the present invention. The wiping element 42 typically includes head portion 50 and a wiping portion 52. The head portion 50 is operatively attached to the spline 44 with an adhesive, such as glue (not shown, but generally known in the art). However, it will be appreciated that wiping element 42 could be operatively attached to the spline 44 in any suitable way without departing from the scope of the present invention. The wiping portion 52 of the wiping element 42 is adapted to contact the surface to be wiped 30. As shown in FIGS. 13 and 14, the wiping portion 52 has a generally triangular, tapered profile. However, those having ordinary skill in the art will appreciate that the wiping portion 52 could have any suitable profile, shape, or configuration without departing from the scope of the present invention.

As previously noted, the wiper blade 36 also includes at least one spline 44, which extends between opposed longitudinal ends 54. The spline 44 is constructed from a resiliently flexible material, such as spring steel or a polymer, and is adapted to apply force from an intermediate position between the longitudinal ends 54. More specifically, the spline 44 receives force from the spring-loaded wiper arm 34 at an intermediate position and distributes this force across the span of the spline 44 toward the longitudinal ends 54. To that end, the spline 44 may be curved longitudinally with a predetermined radius of curvature. In the related art, this predetermined radius of curvature is sometimes referred to as a "free form" radius of curvature. Accordingly, the curvature of the spline 44 may be symmetrical or asymmetrical, depending on the force requirements of the application and the contour of the windshield 30. The flexible, free form, pre-curved spline 44 straightens out when the wiper arm 34 applies a force thereto and directs the wiping element 42 to contact the windshield 30. Thus, the elongated spline 44 includes a free-form curvature that ensures force distribution on windshields having various curvatures and that effects proper wrapping about the windshield 30.

Figure 4:
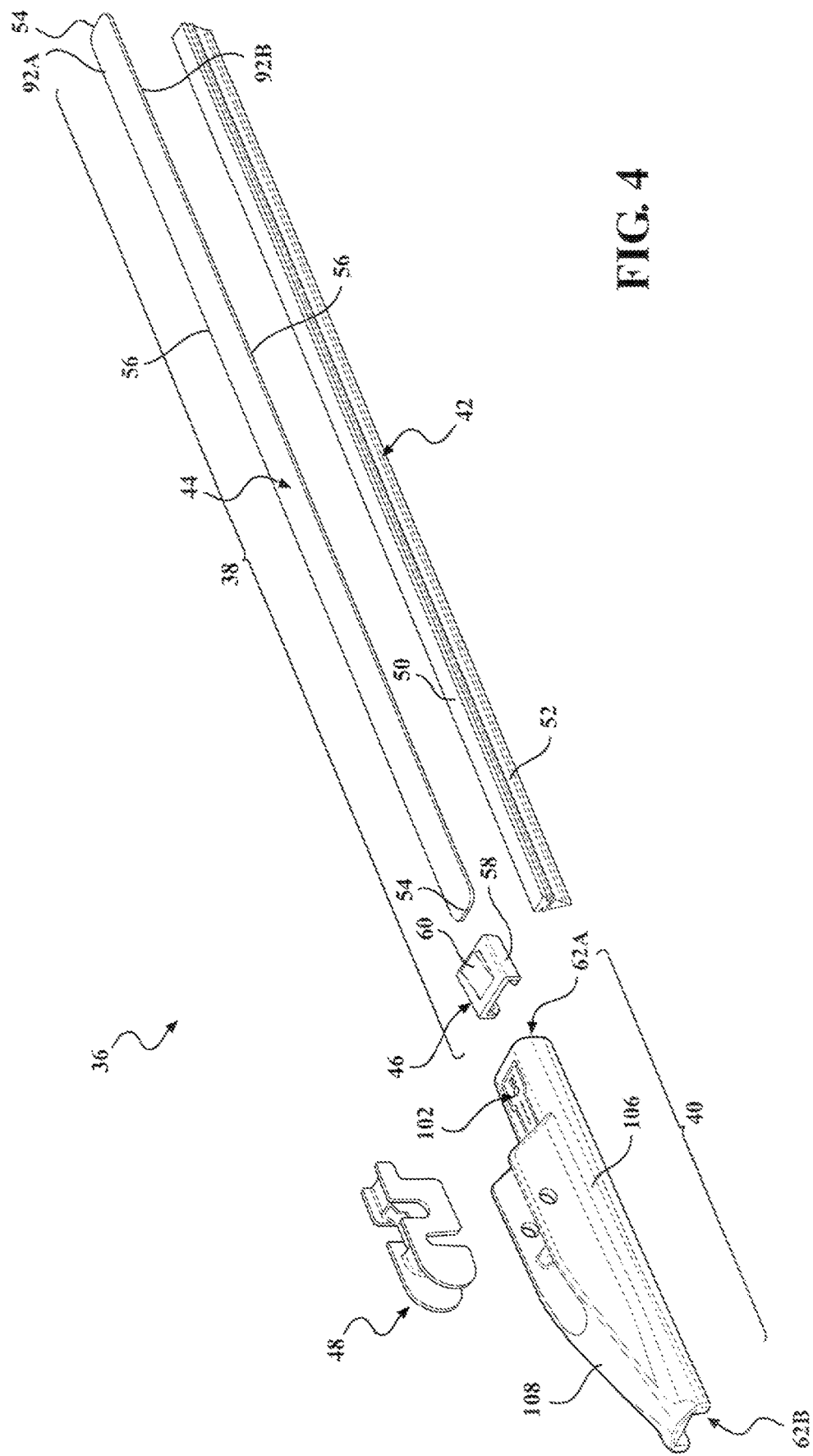
FIG. 4 is an exploded perspective view of the refillable wiper blade of FIGS. 2 and 3.

The spline 44 may have a substantially constant width and a constant thickness throughout its length between the longitudinal ends 54. The constant width and thickness are adapted to provide high lateral and torsional stiffness so as to avoid lateral and torsional deflections, which cause the wiping element 42 to stick/slip ("chatter") on the windshield 30 during operation. Thus, the cross-section of the spline 44 has a generally rectangular outer profile that makes the spline 44 easier to manufacture. More specifically, where the spline 44 is constructed from metal, such as spring steel, the tools and machinery used to manufacture the spline 44 are less complicated than those required to manufacture a spline 44 having varying width and/or thickness. Furthermore, where the spline 44 is constructed from a polymer, such as a thermoplastic elastomer, the manufacturing tools and extrusion process machinery are also less complicated than those employed to manufacture varying width and/or thicknesses. However, those having ordinary skill in the art will appreciate that the spline 44 could have a varying thickness and/or width without departing from the scope of the present invention. Further, as mentioned above, those having ordinary skill in the art will appreciate that the spline 44 could be monolithic or could be formed as a plurality of splines (sometimes referred to in the art as a "twin rail" blade). As described in greater detail below, the spline 44 may also include one or more retention notches 56 that cooperate with the retention clip 46 of the refill subassembly 38 so as to facilitate releasable attachment to the coupler 40, as noted above. As shown in FIG. 4, the notches 56 are generally rectangular, but those having ordinary skill in the art will appreciate that the notches could have any suitable shape without departing from the scope of the present invention. In the representative embodiment of the refillable wiper blade 36 illustrated herein, the spline 44 of the refill subassembly 38 has longitudinal ends 54 with a chamfered or generally rounded profile. However, those having ordinary skill in the art will appreciate that the longitudinal ends 54 could have any suitable profile without departing from the scope of the present invention.

Referring now to FIGS. 2-14, as noted above, the present invention is directed towards a refillable wiper blade 36 with a refill subassembly 38 that is releasably attachable to a coupler 42 via a retention clip 46. To that end, the retention clip 46 has a clip body, generally indicated at 58, and an upwardly-biased cantilevered finger 60 extending from the clip body 58. The coupler 40 has a first end 62A shaped to receive the clip body 58, and a relief 64 defined adjacent to the first end 62A and shaped to accommodate the cantilevered finger 60. As described in greater detail below, the coupler 40 and the refill subassembly 38 are configured such that predetermined movement of the coupler 40 with respect to and along the spline 44 of the refill subassembly 38 brings the clip body 58 of the retention clip 46 into engagement with the first end 62A of the coupler 40 (compare FIG. 6 to FIG. 5) such that the cantilevered finger 60 deflects downwardly until subsequent movement of the coupler 40 along the spline 44 releases the cantilevered finger 60 upwardly and into the relief 64 of the coupler 40 thereby securing the refill subassembly 38 to the coupler 40 (See FIG. 15). Each of these components will be described in greater detail below.

The coupler 40 is a unitary, one piece component. However, those having ordinary skill in the art will appreciate that the coupler 40 could be designed as a plurality of components that interlock or otherwise cooperate to operatively attach to the refill subassembly 38 and/or the adapter 48, without departing from the scope of the present invention. The coupler 40 is typically constructed from plastic and is formed using an injection molding process. However, those having ordinary skill in the art will appreciate that the coupler 40 could be constructed from any suitable material formed using any suitable process without departing from the scope of the present invention. Similarly, the retention clip 46 is formed as a unitary, one piece component and is typically construction from plastic formed using an injection molding process.

Referring now to FIGS. 11-15, in one embodiment, the clip body 58 of the retention clip 46 has an upper clip surface 66, and the cantilevered finger 60 at least partially extends above the upper clip surface 66. In the representative embodiment of the retention clip 46 illustrated herein, the clip body 58 further includes a window 68 defined in the upper clip surface 66 which, in turn, at least partially defines the cantilevered finger 60 (see FIG. 11). Here, the cantilevered finger 60 has a generally rectangular profile extending at an angle with respect to the upper clip surface 66, and the window 68 likewise has a rectangular profile complimentary to the profile of the cantilevered finger 60 so as to allow downward deflection, as described above.

Figure 15:
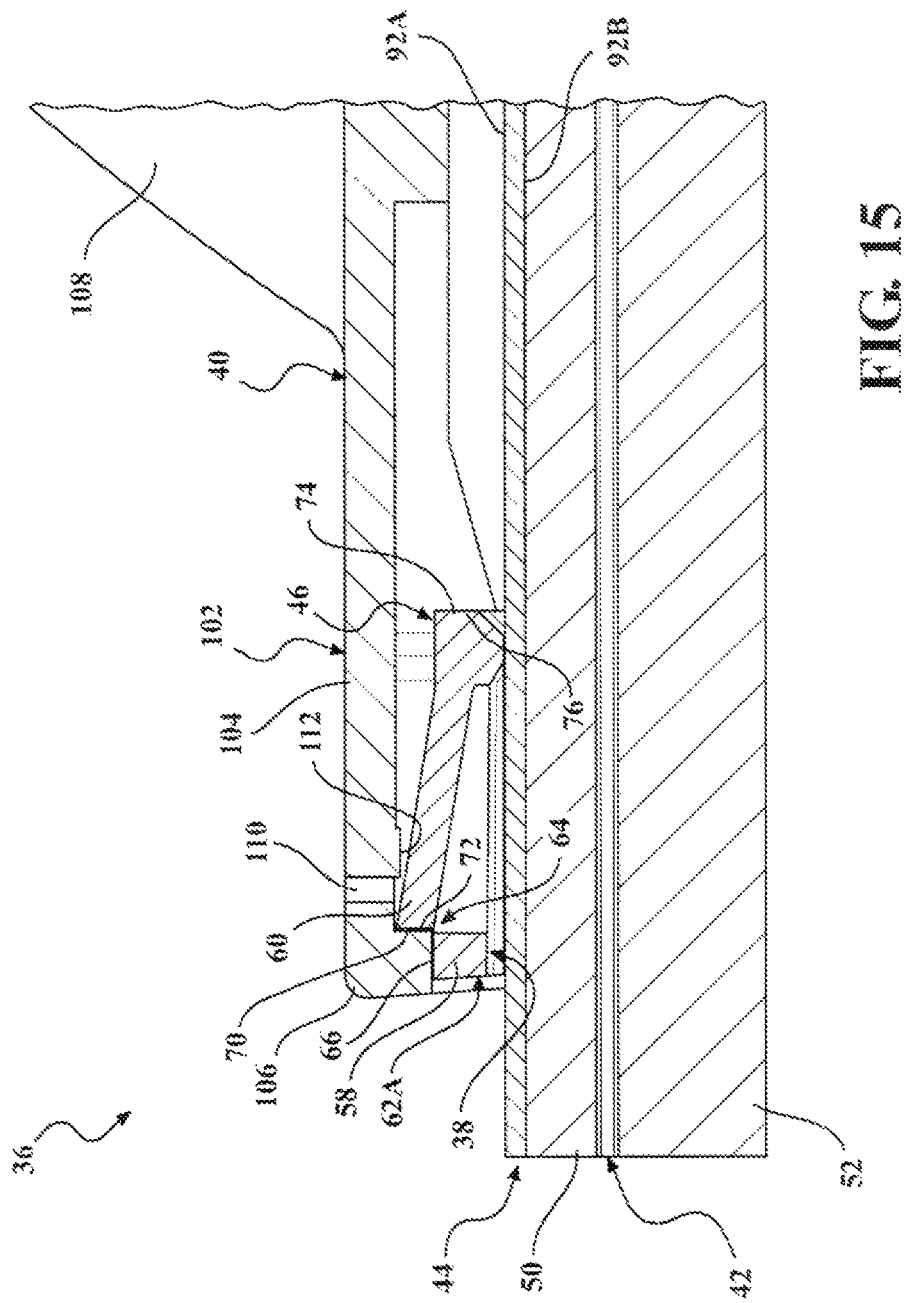
FIG. 15 is a broken-out sectional view taken along line 15-15 of FIG. 3.

In one embodiment, the cantilevered finger 60 extends to a finger edge 70, and the coupler 40 includes an engagement edge, generally indicated at 72, defined adjacent to the relief 64 such that the engagement edge 72 at least partially abuts the finger edge 70 so as to secure the refill subassembly 38 to the coupler 40 (see FIG. 15). Further, in one embodiment, the retention clip 46 has a clip stop edge 74 and the coupler 40 has a coupler stop edge 76 defined adjacent to the first end 62A such that the coupler stop edge 76 at least partially abuts the clip stop edge 74 when the refill subassembly 38 is secured to the coupler 40.

Figure 12:
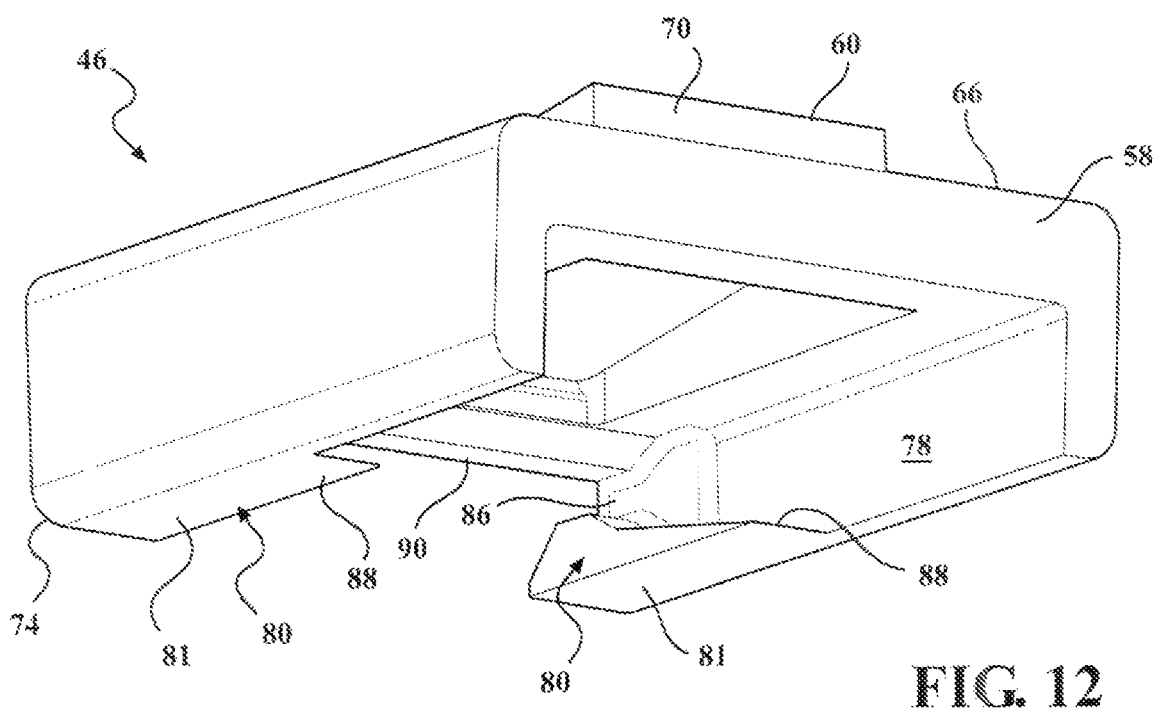
FIG. 12 is a rotated perspective view of the retention clip of FIG. 11.

As shown best in FIGS. 12 and 14, the clip body 58 of the retention clip 46 has a pair of inner walls 78 facing each other for accommodating the spline 44 therebetween. In one embodiment, the clip body 58 further includes a lower member 80 extending from each of the inner walls 78 and having a lower member surface 81, and the coupler 40 includes a pair of braces 82 each having an upper brace surface 84 arranged so as to at least partially abut one of the lower member surfaces 81 of the lower members 80 of the retention clip 46 when the refill subassembly 38 is secured to the coupler 40.

As noted above, the retention clip 46 of the refill subassembly 38 is operatively attached to the spline 44 so as to facilitate releasable attachment to the coupler 40, as well as to help support and align the spline 44 and wiping element 42 with respect to the coupler 40. To that end, the clip body 58 of the retention clip 46 has at least one retention block 86 shaped to engage the retention notch 56 of the spline 44 so as to operatively attach the retention clip 46 to the spline 44. In the representative embodiment illustrated herein, the clip body 58 of the retention clip 46 has a pair of retention blocks 86, and the spline has a corresponding pair of retention notches 56 for accommodating the retention blocks 86. In one embodiment, the clip body 58 has at least one clip ramp 88 arranged such that the clip ramp 88 and the retention block 86 urge the inner walls 78 away from each other so as to accommodate the spline 44 between the inner walls 78 in absence of engagement of the retention block 86 in the retention notch 56.

Figure 11:
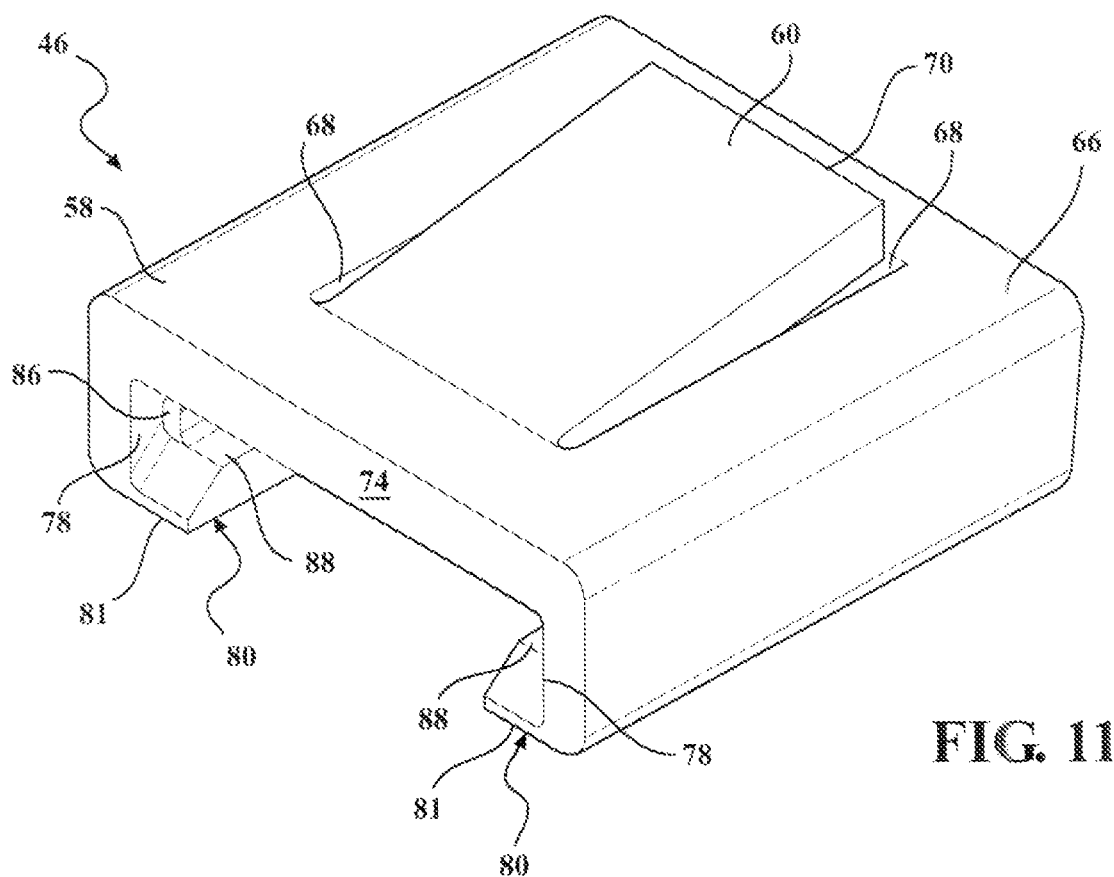
FIG. 11 is a perspective view of the retention clip of the refill subassembly of the refillable wiper blade of FIGS. 2-9.

As shown best in FIGS. 11 and 12, in one embodiment, the clip body 58 of the retention clip 46 has at least one clip spacing formation 90 supporting the spline 44. More specifically, the spline 44 of the refill subassembly 38 has opposing top and bottom spline surfaces 92A, 92B and the clip spacing formation 90 abuts the top spline surface 92A. Similarly, as shown best in FIGS. 7-9, the coupler 40 has a second end 62B spaced from the first end 62A and at least one coupler spacing formation 94 for supporting the spline 44 of the refill subassembly 38 when the coupler 40 is secured to the refill subassembly 38. Those having ordinary skill in the art will appreciate that the clip spacing formation 90 and the coupler spacing formation 94 cooperate to support the spline 44 in operation and, at the same time, allow the spline 44 to curve upwardly into the coupler 40 so as to ensure proper engagement of the wiper blade 36 and windshield 30 in operation.

Figure 8:
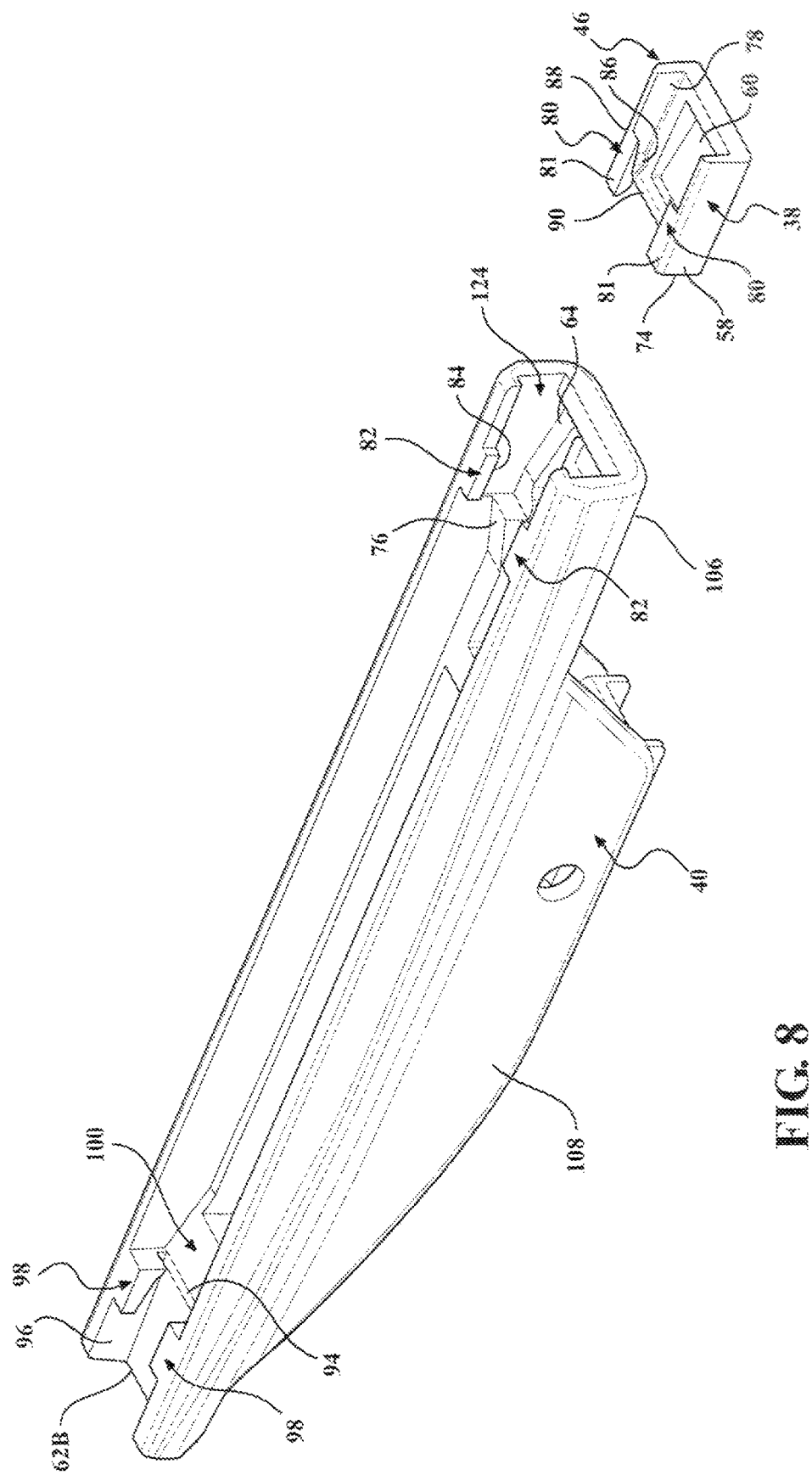
FIG. 8 is an alternate bottom perspective view of the refillable wiper blade of FIG. 7 depicted in the unsecured configuration, showing the coupler and the retention clip of the refill subassembly.
Figure 9:
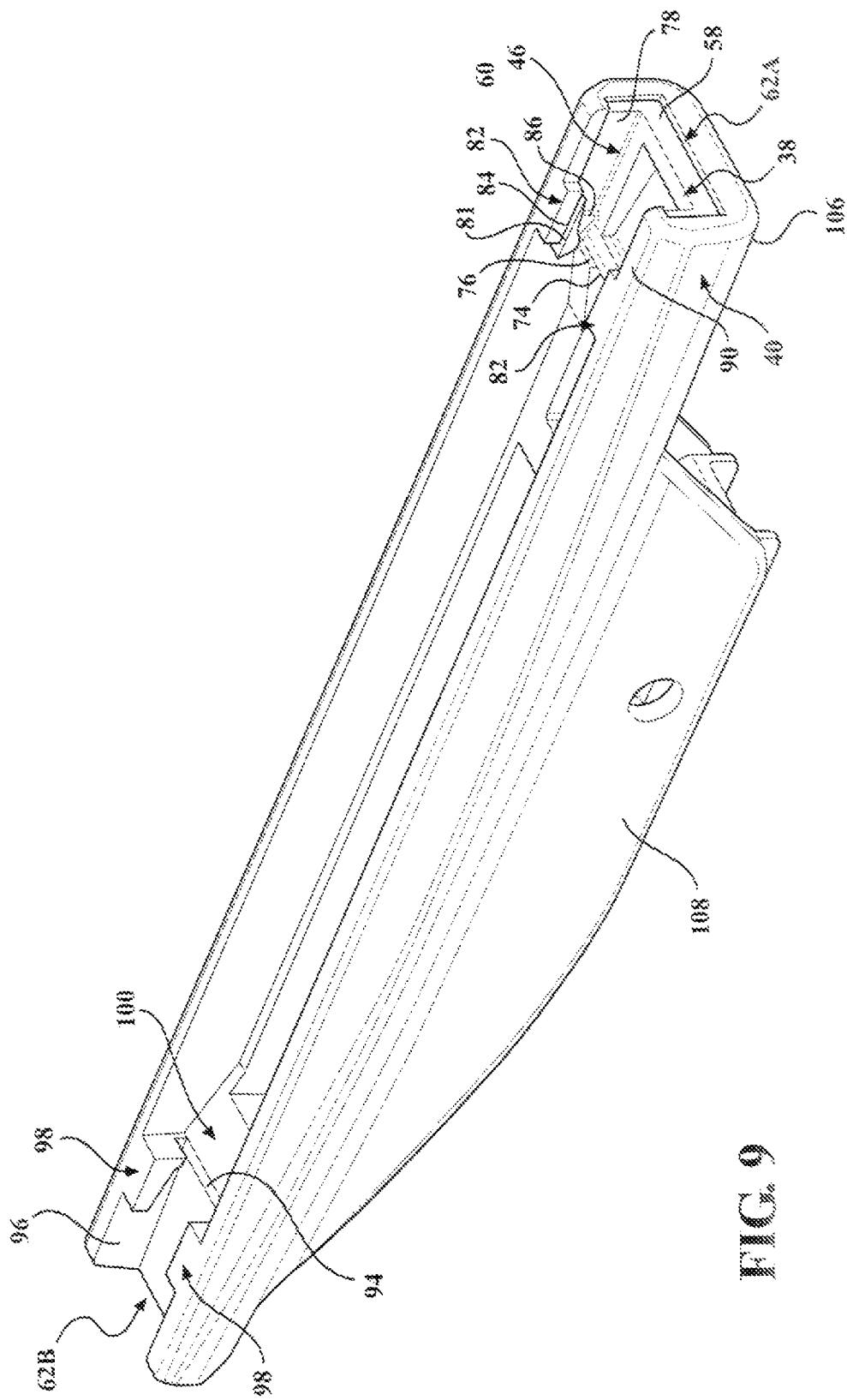
FIG. 9 is an alternate perspective view of the refillable wiper blade of FIG. 8 depicted in the secured configuration.

As best shown in FIGS. 8 and 9, the coupler 40 also includes a pair of inner coupler walls, generally indicated at 96, facing each other and spaced to accommodate the spline 44 therebetween. In the representative embodiment illustrated herein, the coupler 40 further includes a pair of shelves 98 extending towards each other from the inner coupler walls 96. The shelves 98 are disposed adjacent to the coupler spacing formation 94, abut the bottom spline surface 92B of the spline 44, help secure the spline 44 to the coupler 40, and support the refill subassembly 38 in operation.

Figure 5:
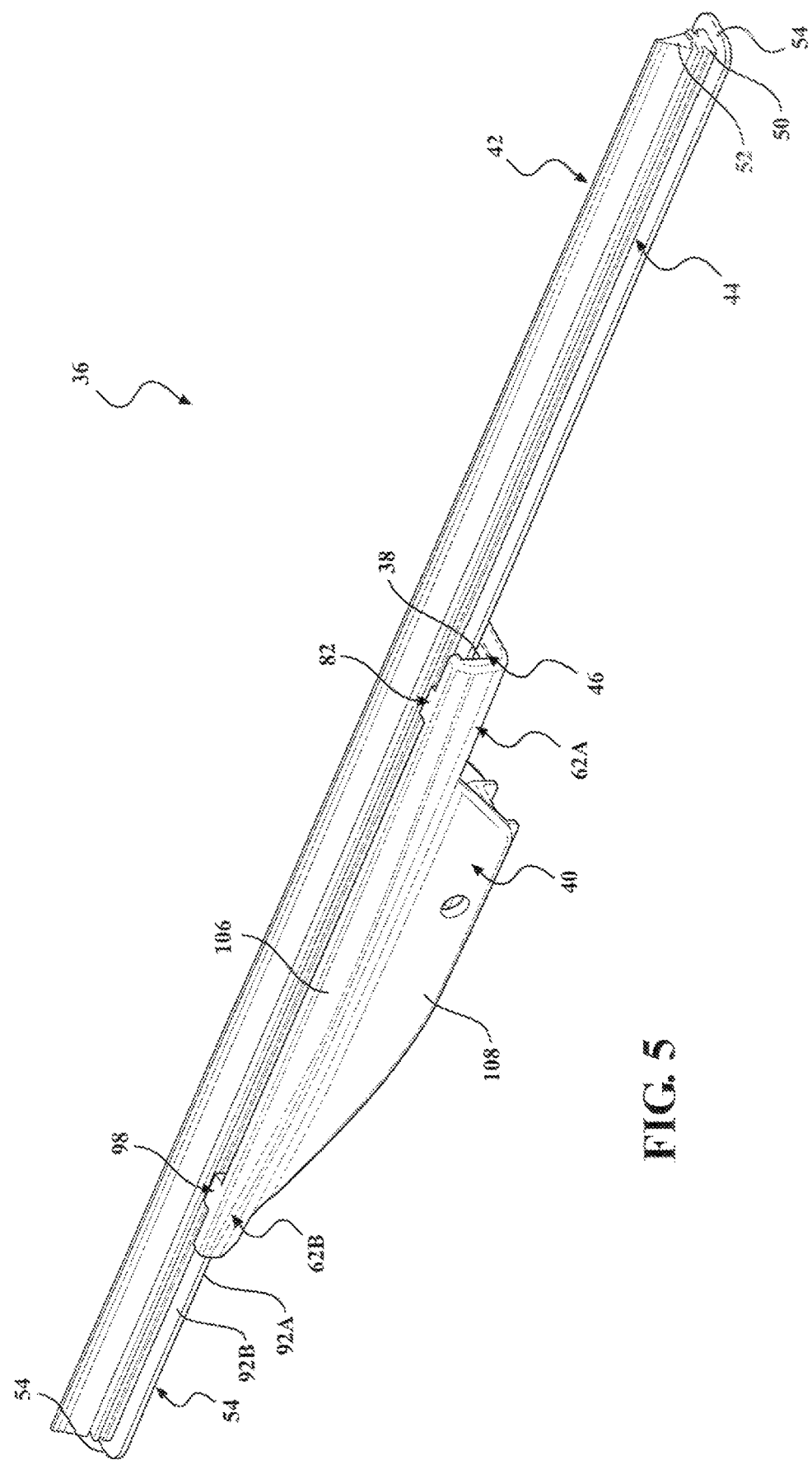
FIG. 5 is a bottom perspective view of the refillable wiper blade of FIG. 2 with the coupler and the refill subassembly in a secured configuration.
Figure 6:
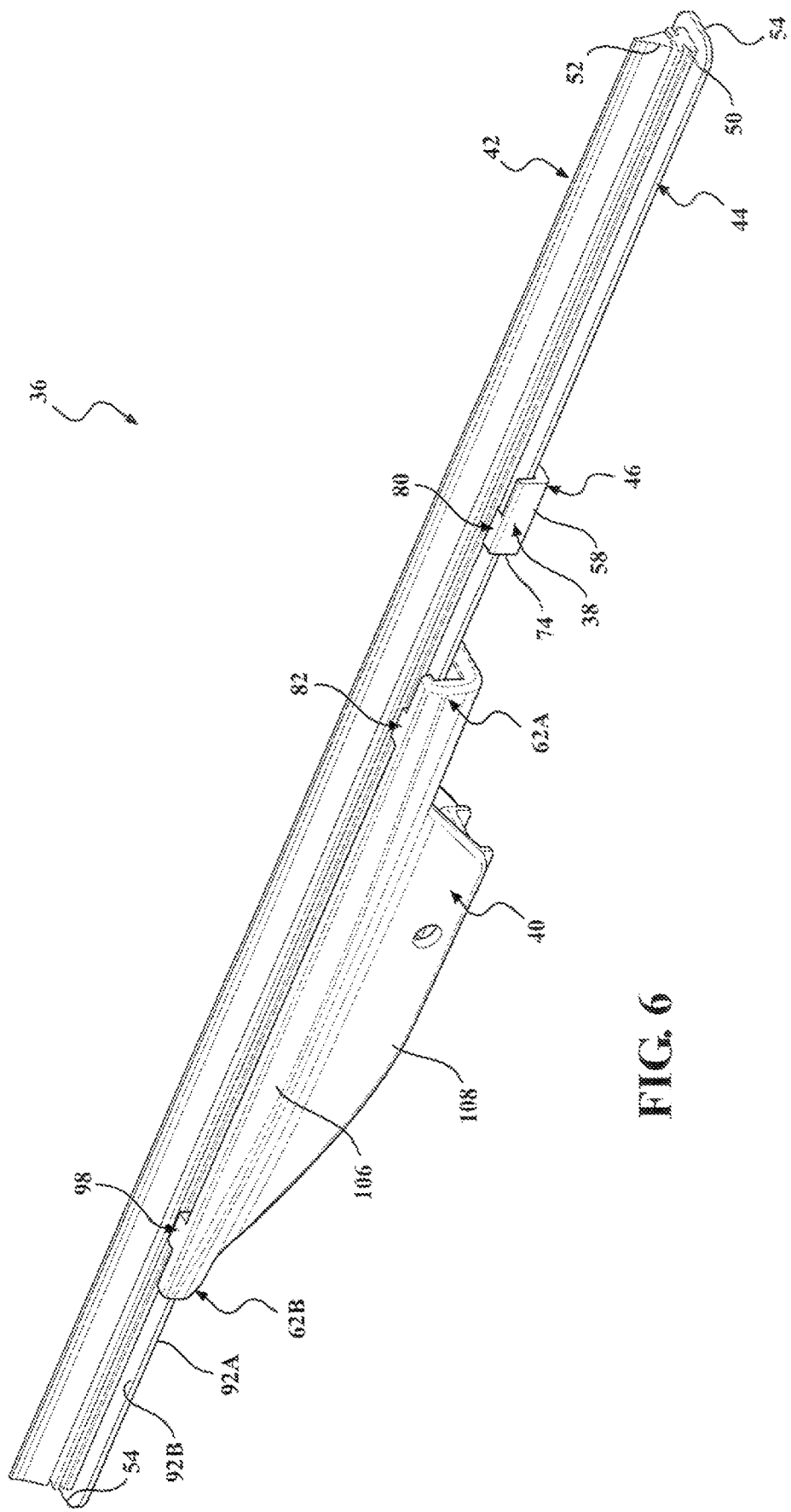
FIG. 6 is an alternate perspective view of the refillable wiper blade of FIG. 5 with the coupler and the refill subassembly depicted in an unsecured configuration, the refill subassembly shown having a wiping element, a spline, and a retention clip according to one embodiment of the present invention.
Figure 7:
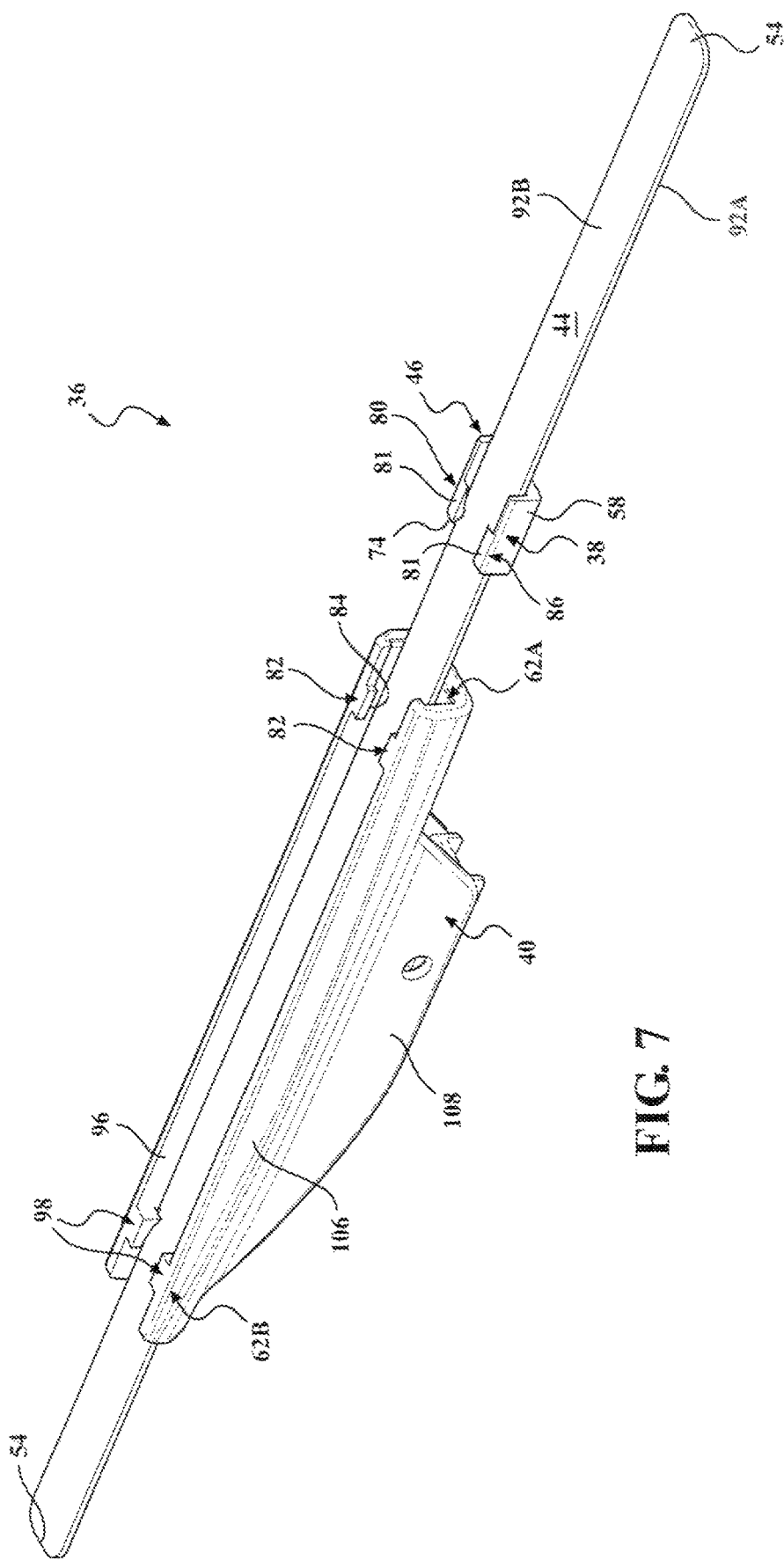
FIG. 7 is an alternate perspective view of the refillable wiper blade of FIG. 6 depicted in the unsecured configuration, showing the coupler and the spline and retention clip of the refill subassembly.
Figure 10:
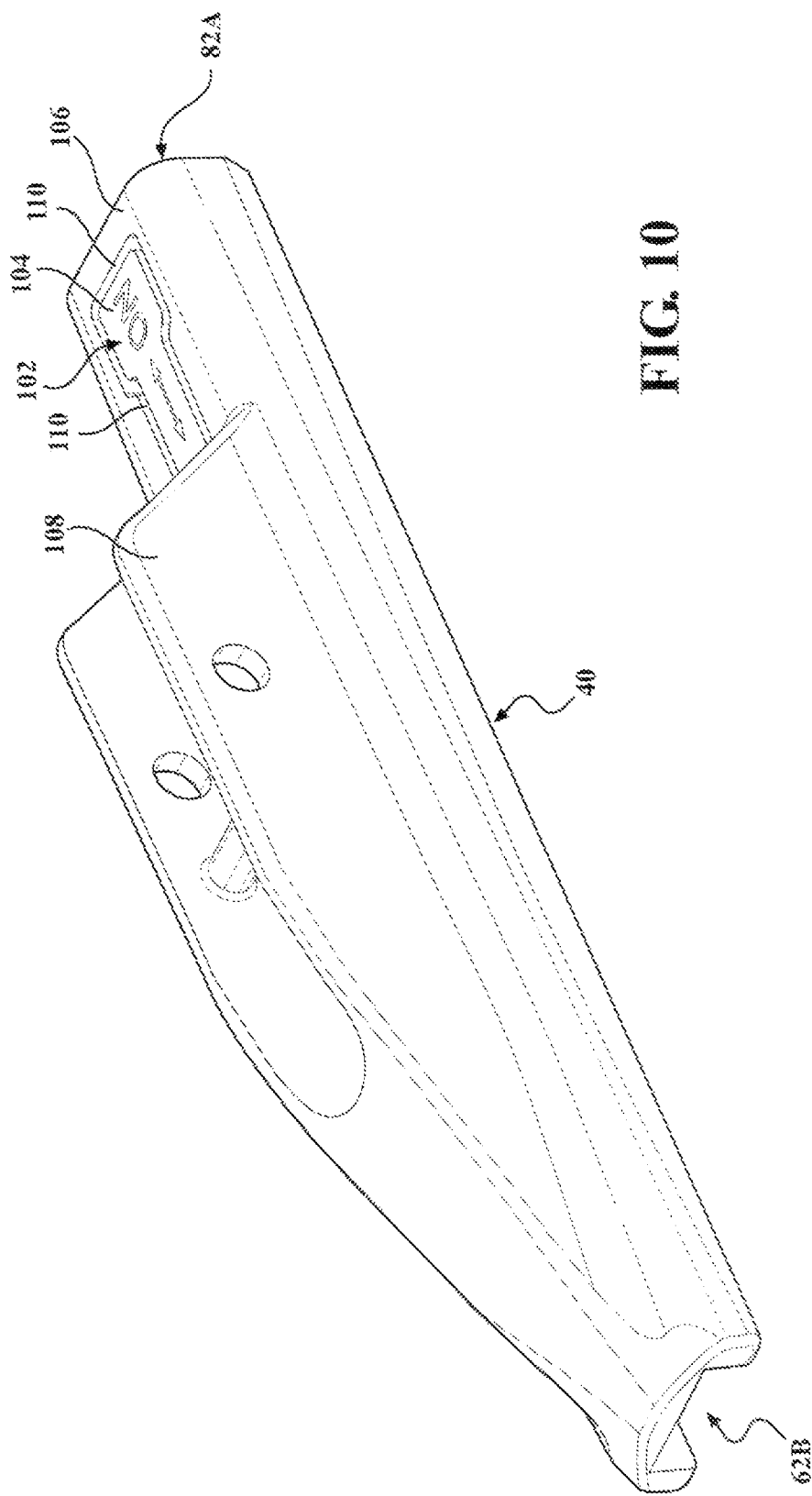
FIG. 10 is a perspective view of the coupler of the refillable wiper blade of FIGS. 2-9.

In one embodiment, the coupler 40 has at least one coupler ramp 100 arranged between the first end 62A and the second end 62B for guiding the spline 44 of the refill subassembly 38 along the coupler 40 as the coupler 40 moves along the spline 44 (see FIG. 8 and compare to FIGS. 6 and 5). As shown in FIGS. 9, 10, and 15, in one embodiment, the coupler 40 includes a release 102 arranged adjacent to the cantilevered finger 60 of the retention clip 48 of the secured refill subassembly 38. The release 102 is shaped to translate force to the cantilevered finger 60 so as to correspondingly deflect the cantilevered finger 60 downwardly so as to facilitate selective removal of the refill subassembly 38 from the coupler 40, as noted above. In the representative embodiment illustrated herein, the release 102 includes a cantilevered arm 104 integrally formed with the coupler 40. More specifically, the coupler 40 has a base 106 extending longitudinally between the first end 62A and the second end 62B, and a mount, generally indicated at 108, extending upwardly from the base 106 and adapted to attach to the adapter 48, as noted above, with the cantilevered arm 104 of the release 102 defined in the base 106 of the coupler 40 and is integrally formed with the coupler 40. Here, the base 106 of the coupler 40 further includes a base window 110 with the cantilevered arm 104 supported therein. The base window 110 has a profile complimentary to a profile of the cantilevered arm 104 so as to facilitate selective downward deflection of the cantilevered arm 104 into engagement with the cantilevered finger 60 of the retention clip 46, as discussed above.

Referring now to FIG. 15, in one embodiment, the cantilevered arm 104 of the release 102 of the coupler 40 includes a protrusion 112 depending downwardly and disposed adjacent to the cantilevered finger 60 of the retention clip 46. The protrusion 112 is arranged to engage the cantilevered finger 60 of the retention clip 46 in response to force applied to the release 102 so as to facilitate selective removal of the refill subassembly 38 from the coupler 40, as noted above.

In this way, the present invention provides a refillable wiper blade 36 for a wiper system 32 that affords simple, releasable attachment of the coupler 40 and the refill subassembly 38. Specifically, those having ordinary skill in the art will appreciate that the retention clip 46 can be selectively secured within the first end 62A of the coupler 40, via cooperation between the retention clip 46 and the relief 64, in a simple and reliable way. Moreover, it will be appreciated that the clip body 58 of the retention clip 46 and the first end 62A of the coupler 40 are complimentarily shaped so as to urge the cantilevered finger 60 towards the clip body 58, as noted above, as the refill subassembly 38 is brought into engagement with the coupler 40. Those having ordinary skill in the art will appreciate that the present invention affords significant advantages in that the refillable wiper blade 36 can be effectively "replaced" in a quick, simple manor by removing an old refill subassembly 38 and subsequently installing a new refill subassembly 38. Specifically, it will be appreciated that replacement of the refill subassembly 38 can be achieved without necessitating removal of the wiper blade 36 from the wiper arm 34, and the coupler 40 and/or adapter 48 can remain attached to the wiper arm 34 of a vehicle 20 while the refill subassembly 38 is replaced quickly and efficiently. Moreover, replacement of the refill subassembly 38 can be achieved at relatively low cost to the consumer, when compared to the cost of replacing an entire wiper blade 36, in that the coupler 40 need not be replaced under normal operating conditions. Thus, routine or otherwise scheduled replacement of the refill subassembly 38 can be achieved at low consumer cost while, at the same time, ensuring that the refillable wiper blade 36 delivers good wipe quality irrespective of how long the coupler 40 is utilized. Here, it is conceivable that refill subassemblies 38 could be replaced on refillable wiper blades 36 equipped on a vehicle 20 during other routine vehicle 20 maintenance, such as during an oil change.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A refillable wiper blade comprising:
a refill subassembly including a wiping element adapted to contact a surface to be wiped, at least one elongated spline acting to support said wiping element, and a retention clip operatively attached to said spline, said retention clip having a clip body with an upper clip surface and an upwardly-biased cantilevered finger having a generally rectangular profile extending from said clip body and partially above said upper clip surface, wherein said spline includes at least one retention notch and said clip body includes at least one retention block engaging said retention notch; and
a coupler adapted for releasable attachment to said refill subassembly, said coupler having a first end shaped to receive said clip body of said retention clip, and a relief defined adjacent to said first end and shaped to accommodate said cantilevered finger of said retention clip;
wherein said refill subassembly and said coupler cooperate such that predetermined movement of said coupler with respect to said spline of said refill subassembly brings said clip body into engagement with said first end of said coupler such that said cantilevered finger deflects downwardly through an opening defined by said upper clip surface until subsequent movement of said coupler along said spline releases said cantilevered finger upwardly and into said relief of said coupler thereby securing said refill subassembly to said coupler, said opening having a profile complimentary to said generally rectangular profile of said cantilevered finger.

2. The refillable wiper blade of claim 1 where said spline includes longitudinal ends with a chamfered profile.

3. The refillable wiper blade of claim 1 wherein said retention clip has a pair of inner walls, said inner walls including a lower member extending from each of said inner walls and having a lower member surface, and said coupler including a pair of braces each having an upper brace surface.

4. The refillable wiper blade of claim 3 wherein each said upper brace surface is arranged to at least partially abut one of said lower member surfaces of said lower members of said retention clip when said refill subassembly is secured to said coupler.

5. The refillable wiper blade of claim 1 wherein said clip body of said retention clip includes at least one clip spacing formation supporting said spline.

6. The refillable wiper blade of claim 5 wherein said coupler includes a pair of inner coupler walls facing each other and spaced to accommodate said spline and said coupler includes a pair of shelves extending towards each other from said inner coupler walls.

7. The refillable wiper blade of claim 1 wherein said coupler includes a release arranged adjacent to said upwardly-biased cantilevered finger of said retention clip shaped to translate force to the cantilevered finger to deflect the cantilevered finger downwardly to facilitate removal of the refill subassembly.

8. The refillable wiper blade of claim 7 wherein said release includes a cantilevered arm integrally formed with said coupler.

9. The refillable wiper blade of claim 8 wherein said cantilevered arm of said release includes a protrusion disposed adjacent to the cantilevered finger of said retention clip and arranged to engage said cantilevered finger.

10. The refillable wiper blade of claim 8 wherein said coupler defines a base window having a profile complimentary to a profile of the cantilevered arm to facilitate selective downward deflection of said cantilevered arm into engagement with said cantilevered finger.

11. A refill subassembly for releasably attaching to a wiper blade coupler, the coupler having a first end and a relief defined adjacent to the first end, said refill subassembly comprising:
a wiping element adapted to contact the surface to be wiped;
at least one elongated spline acting to support said wiping element, wherein said spline includes at least one retention notch; and
a retention clip having a clip body shaped for receipt in the first end of the coupler, and an upwardly-biased cantilevered finger extending from said clip body and having a generally rectangular profile for accommodation in the relief of the coupler, wherein said retention clip has a pair of inner walls, said inner walls including a lower member extending from each of said inner walls and having a lower member surface, and wherein said clip body includes at least one retention block shaped to engage said retention notch;
wherein said refill subassembly is adapted to cooperate with the coupler such that predetermined movement of said refill subassembly within the coupler brings said clip body into engagement with the first end of the coupler such that said cantilevered finger deflects downwardly through an opening defined by an upper clip surface of said clip body until subsequent movement of said spline with respect to the first end of the coupler releases said cantilevered finger upwardly and into the relief of the coupler thereby securing said refill subassembly to the coupler.

12. The refillable wiper blade of claim 11 where said spline includes longitudinal ends with a chamfered profile.

13. A refillable wiper blade comprising:
a refill subassembly including a wiping element adapted to contact a surface to be wiped, at least one elongated spline acting to support said wiping element, and a retention clip operatively attached to said spline, said retention clip having a clip body with an upper clip surface and an upwardly-biased cantilevered finger having a generally rectangular profile extending from said clip body and partially above said upper clip surface, wherein said clip body of said retention clip includes at least one clip spacing formation supporting said spline; and a coupler adapted for releasable attachment to said refill subassembly, said coupler having a first end shaped to receive said clip body of said retention clip, and a relief defined adjacent to said first end and shaped to accommodate said cantilevered finger of said retention clip;

wherein said refill subassembly and said coupler cooperate such that predetermined movement of said coupler with respect to said spline of said refill subassembly brings said clip body into engagement with said first end of said coupler such that said cantilevered finger deflects downwardly through an opening defined by said upper clip surface until subsequent movement of said coupler along said spline releases said cantilevered finger upwardly and into said relief of said coupler thereby securing said refill subassembly to said coupler, said opening having a profile complimentary to said generally rectangular profile of said cantilevered finger.

14. The refillable wiper blade of claim 13 wherein said coupler includes a pair of inner coupler walls facing each other and spaced to accommodate said spline and said coupler includes a pair of shelves extending towards each other from said inner coupler walls.

15. A refillable wiper blade comprising:
a refill subassembly including a wiping element adapted to contact a surface to be wiped, at least one elongated spline acting to support said wiping element, and a retention clip operatively attached to said spline, said retention clip having a clip body with an upper clip surface and an upwardly-biased cantilevered finger having a generally rectangular profile extending from said clip body and partially above said upper clip surface; and a coupler adapted for releasable attachment to said refill subassembly, said coupler having a first end shaped to receive said clip body of said retention clip, a relief defined adjacent to said first end and shaped to accommodate said cantilevered finger of said retention clip, and a release arranged adjacent to said upwardly-biased cantilevered finger of said retention clip shaped to translate force to the cantilevered finger to deflect the cantilevered finger downwardly to facilitate removal of the refill subassembly;

wherein said refill subassembly and said coupler cooperate such that predetermined movement of said coupler with respect to said spline of said refill subassembly brings said clip body into engagement with said first end of said coupler such that said cantilevered finger deflects downwardly through an opening defined by said upper clip surface until subsequent movement of said coupler along said spline releases said cantilevered finger upwardly and into said relief of said coupler thereby securing said refill subassembly to said coupler, said opening having a profile complimentary to said generally rectangular profile of said cantilevered finger.

16. The refillable wiper blade of claim 15 wherein said release includes a cantilevered arm integrally formed with said coupler.

17. The refillable wiper blade of claim 16 wherein said cantilevered arm of said release includes a protrusion disposed adjacent to the cantilevered finger of said retention clip and arranged to engage said cantilevered finger.

18. The refillable wiper blade of claim 16 wherein said coupler defines a base window having a profile complimentary to a profile of the cantilevered arm to facilitate selective downward deflection of said cantilevered arm into engagement with said cantilevered finger.

* * * * *